3,788,977
HYDROCARBON CRACKING WITH BOTH AZEOLITE AND Pt-U-ALUMINA IN THE MATRIX
Geoffrey E. Dolbear, Columbia, and John S. Magee, Jr., Cooksville, Md., assignors to W. R. Grace & Co., New York, N.Y.
No Drawing. Continuation-in-part of applications Ser. No. 78,156, Oct. 5, 1970, and Ser. No. 92,917, Nov. 25, 1970, both now abandoned. This application June 1, 1972, Ser. No. 258,646
Int. Cl. B01j 9/20; C01b 33/28; C10g 11/00
U.S. Cl. 208—120          3 Claims

ABSTRACT OF THE DISCLOSURE

Uranium oxide and platinum metal impregnated upon an inorganic oxide support is added to conventional zeolite promoted cracking catalyst to increase the formation of aromatics in conventional hydrocarbon cracking reactions.

---

This application is a continuation-in-part of U.S. Ser. No. 78,156, filed Oct. 5, 1970, and Ser. No. 92,917, filed Nov. 25, 1970 (both now abandoned).

The present invention relates to hydrocarbon conversion catalysts, and more specifically to catalytic cracking catalyst compositions which produce an enhanced amount of aromatic gasoline fractions from gas oil feedstocks.

Zeolite promoted hydrocarbon cracking catalysts, particularly those containing faujasite, are known to be highly active and selective for the production of gasoline from gas oil type feedstocks. Gasoline fractions produced by zeolite catalysts possess moderate clear octane rating and generally require the addition of anti-knock components prior to being used as motor fuel.

Typical anti-knock additives are organic lead compounds and/or reformate stocks which contain a high proportion of aromatics. The addition of such additives is expensive. In order to keep the addition level to a minimum, the octane level of the clear cracker gasoline is maintained as high as possible.

Accordingly, the primary objective of petroleum refiners is to select catalysts and cat-cracking conditions which maximize the formation of high octane gasoline components during the cracking process. It is noted, however, that previous attempts to modify cracking catalysts so as to increase the aromatic producing properties thereof as frequently led to the preparation of catalysts which have undesirable characteristics such as low activity and/or high coke and hydrogen production.

It is therefore an object of the present invention to provide a hydrocarbon cracking catalyst which will produce gasoline fractions having a high aromatic content.

It is a further object to provide an additive which may be conveniently added to conventional zeolite hydrocarbon cracking catalysts which will enhance the aromatic gasoline production capability thereof.

It is still another object to provide a highly active zeolite promoted hydrocarbon conversion catalyst which possesses a high degree of aromatic production selectivity and a minimum tendency to form undesirable coke and dry gas fractions.

These and still further objects of the present invention will become readily apparent to one skilled in the art from the following detailed description and specific examples.

Broadly, our invention contemplates a cracking catalyst composition which comprises a zeolite catalyst in combination with a minor amount of a reforming-like additive which consists of uranium oxide and/or platinum metal impregnated upon an inorganic oxide support.

More specifically, we have found that the aromatic producing capability of a zeolite cracking catalyst may be considerably enhanced by the addition of from about 1 to about 20 percent by weight of reforming-like additive which comprises from about 1 to 20 percent by weight of uranium oxide or from about .01 to 1 percent by weight platinum impregnated upon an inorganic oxide base.

When the above specified reforming-like additive is combined with a conventional zeolite catalyst in the amounts indicated, the resulting catalyst may be utilized in a conventional catalytic cracking reactor to produce a high level of aromatic gasoline fraction. This increase in aromatic formation is not accompanied by an increase in coke production which is frequently encountered in reforming type reactions conducted in the absence of a high pressure of hydrogen.

The present catalyst compositions contain a conventional zeolite type cracking catalyst in combination with additive amounts of uranium oxide and/or platinum impregnated upon an inorganic oxide base. The zeolitic catalyst component may be conventional zeolite promoted hydrocarbon cracking catalysts which are readily available from commercial sources. A typical zeolitic cracking catalyst will contain from about 5 to 60 percent by weight and preferably 10 to 40 percent by weight of a thermally or chemically modified synthetic faujasite (as a zeolite promoter) in combination with 95 to 50 percent by weight of inorganic oxide matrix components.

Typical zeolite promoters are fully described in the prior art, and may comprise hydrogen and/or rare earth exchanged synthetic faujasites which possess silica to alumina ratios on the order of 2.5 up to about 6. These faujasites refered to as type X or Y faujasites are prepared from synthetic faujasite and are generally available in the alkali metal form thereof. To prepare the cracking catalyst additive, the alkali metal faujasites are normally exchanged with solutions containing hydrogen and/or rare earth ions, subsequently calcined, and finally washed or ammonium exchanged to reduce the soda level thereof to below about 0.5 percent by weight. Typical rare earth exchanged faujasite and the preparation thereof are fully disclosed in U.S. Pat. No. 3,402,996 to Maher et al.

In addition to rare earth or metal exchanged faujasites, cracking catalysts which are modified in accordance with the teachings of the present invention may contain hydrogen exchanged, thermally modified zeolites such as are typically disclosed in U.S. Pat. 3,293,192 to Maher et al.

Commercial cracking catalyst compositions which are readily available contain in addition to the zeolite promoter, matrix type materials such as amorphous silica, alumina, and/or silica-alumina hydrogels. The matrix component may also contain or comprise clay such as kaolin or thermally or chemically modified clay such as metakaolin. Typical commercial catalyst compositions which may be enhanced by the addition of the presently contemplated additive are available from a wide variety of manufacturers and are readily identified as XZ-15, XZ-25, XZ-36, XZ-40, DZ-7, DZ-5 and other commercial designations.

The uranium oxide and/or platinum containing additive contemplated herein preferably comprises an inorganic oxide support or base material, typically gamma alumina, which is impregnated with aqueous solution of a soluble platinum or uranium salt. Other support matrixes such as silica, silica-alumina, silica-zirconia, silica-magnesia, and so forth may be used. The base material, subsequent to impregnation with the soluble salt solution, is dried and may be subjected to calcination by heating at a temperature on the order of 350 to 1400° F.

In the case of the preparation of a platinum containing additive it is generally preferred to use an aqueous solution of chloroplatinic acid wherein the platinic acid is present in the solution in amounts ranging from about 0.1 to 10 grams per liter of solution. Subsequent to impregnation of the base with the chloroplatinic acid, the product is subjected to a reducing atmosphere of hydrogen at a temperature of 400 to 1000° F. to convert the chloroplatinic acid to elemental platinum.

Where uranium is used as the reforming-like promoter metal, a solution of uranyl nitrate is typically added to the inorganic oxide support in the form of a solution which contains from about 10 to 200 grams uranyl nitrate per liter of solution. Subsequent to impregnation with the uraniyl nitrate solution, the product is subjected to oven drying, and subsequent calcination for periods of about ½ to 24 hours at a temperature of 350 to 1400° F.

The gamma alumina utilized as the preferred support in the preparation of the reforming like additive is readily available from a variety of commercial sources. Typical gamma aluminas suitable for use in the practice of the present invention should have surface area from 50–400 m.$^2$/g. as measured by the B.E.T. method.

To incorporate the reforming like additive with the conventional zeolite promoted cracking catalysts, the additive is preferably incorporated in the catalyst during the preparation thereof. In this manner a uniform composite of the additive and other catalyst components is obtained. In a typical procedure the present uranium oxide or platinum containing inorganic oxide base is incorporated into a zeolite promoted catalyst composition along with the zeolite additive. In the instance wherein clay containing silica-alumina hydrogel type matrix is utilized, the zeolite additive and the presently contemplated reforming additive may be conveniently added to a slurry of the clay component which is subsequently combined with the required amounts of alumina salt and sodium silicate necessary to form the desired catalyst composition. While it is generally preferred to incorporate the present additive during manufacture of the catalyst, it is also contemplated that physical blends of the present additive and commercial cracking catalyst may be prepared. In any instance it is preferred that the present reforming like additives be present in the final catalyst composition as discrete particles having a particle size range on the order of from about 0.1 to 250 microns.

The presently contemplated catalyst compositions, which comprise a zeolite promoted catalyst and the reforming like additive of the present invention, are utilized in conventional cat-cracking processes. These processes involve the contact of a hydrocarbon feedstock, which typically possesses a boiling range on the order of 400 to 1000° F., under cracking conditions at temperatures on the order of 800 to 1000° F. During the cracking reaction the initial feedstock is converted to components of lower molecular weight including gasoline fractions, and small amounts of hydrogen and coke. Catalysts of the present invention possess activities in commercial units on the order of 60 to 70 percent conversion and the selectivity is such that the aromatic content of the cracked products is substantially increased without any substantial increase in the production of undesirable dry gas or coke fractions.

As will be indicated in the subsequent examples, the increase in aromatic production obtained from the present catalyst compositions is readily detected through the use of nuclear magnetic resonance (NMR) technique which measures the concentration of aromatic hydrogen present in the products of the catalytic reaction. The octane ratings of the gasolines produced by the catalytic reaction are related to the amount of aromatic components as shown by E. F. Schwarzenbek et al., Proceeding of Third World Petroleum Congress, sect. IV, 19.

Having described the basic aspects of the present invention, the following examples are given to illustrate specific embodiments thereof.

EXAMPLE I

A sample of finely divided gamma alumina was impregnated with an aqueous solution of chloroplatinic acid. The chloroplatinic acid solution contained 3.77 grams of the acid in each liter of solution. Sufficient solution was added to the alumina to impart a platinum concentration of 0.3 percent by weight. The impregnated alumina was oven dried at a temperature of about 250° F. and subsequently reduced in a stream of flowing hydrogen maintained at a temperature of 900° F.

A second sample of the same gamma alumina used above was impregnated with an aqueous solution of uranyl nitrate impregnating solution contained 8.49 grams uranyl nitrate per liter of solution. Sufficient solution was added to yield a final $UO_3$ concentration of 10 weight percent in the finished product. The impregnated alumina was oven dried at 250° F., and subsequently calcined for 3 hours at 1400° F.

EXAMPLE II

The gamma alumina samples containing platinum and uranium oxide prepared in Example I were incorporated along with a calcined rare earth type Y faujasite promoter (CREY) at various levels into a washed semi-synthetic type cracking catalyst matrix. The matrix comprised one part by weight kaolin clay and two parts by weight silica-alumina hydrogel which contained 25 percent by weight alumina. Sufficient CREY was incorporated so as to produce a concentration of 10 percent by weight CREY (silica alumina basis) in the catalyst samples. The samples of catalyst were dried and subsequently formed into pills having a diameter of ⅛ inch. The pills were subsequently steamed to stimulate commercial deactivation at a temperature of 1350° F. for a period of 8 hours using 15 p.s.i. steam. Steamed samples were then used to crack gas oil having a boiling range of 500 to 775° F. at a temperature of 920° F. in a standard microactivity apparatus. A weight hourly space velocity of 4.3 and a catalyst oil ratio of 5.8 were utilized. The cracked hydrocarbon products subsequently analyzed for yield of aromatics by use of an NMR technique wherein the total hydrogen content attached to aromatic nuclei was determined. The results of the microactivity tests, the NMR determination for aromatic hydrocarbon, are tabulated in the table below.

TABLE

| Sample number | Additive | | Microactivity | | | Aromatic hydrogen, percent |
|---|---|---|---|---|---|---|
| | Metal or oxide | Percent by weight | Conv. (vol. percent) | H$_2$O (wt. percent) | Coke (wt. percent) | |
| 1 | UO$_3$ | 10 | 80 | .16 | 4.0 | 19.9 |
| 2 | Pt | 2 | 81 | .84 | 6.0 | 22.0 |
| 3 | Pt | 10 | 80 | .59 | 6.7 | 23.8 |
| 4 | None | | 80 | .03 | 3.0 | 19.0 |

Since it is known that the yields of aromatic molecules, as well as the octane numbers, for any cracked gasoline increase with conversion, the samples are compared to a standard CREY containing catalyst at the same conversion.

The above data indicate that the aromatic content of the cracked products increases substantially in the presence of the uranium oxide or platinum containing additive.

The above description and specific examples clearly indicate a superior catalytic cracking composition may be obtained by the addition of the presently contemplated uranium oxide and platinum reforming-like additives.

We claim:

1. The method of catalytically converting hydrocarbons to produce gasoline of increased aromatic content which comprises contacting a hydrocarbon feedstock, without added hydrogen, at a temperature of about 800 to 1000° F. with a cracking catalyst comprising 5 to 50 percent by weight of a crystalline zeolite having a silica to alumina ratio of about 2 to about 7, dispersed in an inorganic oxide matrix having incorporated therein 1 to 20 percent by weight of a composition selected from the group consisting of
   (1) 1 to 20 percent by weight uranium oxide on an inorganic base,
   (2) 0.01 to 1.0 percent by weight platinum on an inorganic base, and
   (3) mixtures of (1) and (2), and recovering from said reaction zone lower boiling hydrocarbons including gasoline of increased aromatic content.

2. The process according to claim 1 wherein the feedstock is a gas oil boiling in the range of 500–775° F.

3. The process according to claim 1 wherein said inorganic matrix is silica-alumina hydrogel and clay, and the platinum-uranium oxide is on a gamma alumina base.

References Cited

UNITED STATES PATENTS

| | | | |
|---|---|---|---|
| 2,124,567 | 7/1938 | Grosse | 208—123 X |
| 2,396,641 | 3/1946 | Connally | 208—123 |
| 2,846,363 | 8/1958 | Folkins et al. | 208—136 |
| 2,939,837 | 6/1960 | Berger | 208—136 |
| 3,397,137 | 8/1968 | Pickert et al. | 208—138 |
| 3,429,830 | 2/1069 | Michael | 252—453 |
| 3,499,836 | 3/1970 | Hayes et al. | 208—138 |
| 3,507,931 | 4/1970 | Morris et al. | 260—683.65 |
| 3,617,491 | 11/1971 | Csicsery | 208—60 |
| 3,650,945 | 3/1972 | Bertolacini et al. | 208—111 |

DELBERT E. GANTZ, Primary Examiner

G. E. SCHMITKONS, Assistant Examiner

U.S. Cl. X.R.

252—455 Z, 477 R